United States Patent [19]

Bartos

[11] 4,409,978

[45] Oct. 18, 1983

[54] PORTABLE, SELF-CONTAINED BREATHING APPARATUS

[75] Inventor: Josef A. Bartos, Chesterland, Ohio

[73] Assignee: Portable Air Supply Systems, Corp., Irwindale, Calif.

[21] Appl. No.: 269,516

[22] Filed: Jun. 1, 1981

Related U.S. Application Data

[63] Continuation-in-part of Ser. No. 159,779, Jun. 16, 1980, abandoned.

[51] Int. Cl.³ .............................................. A62B 7/00
[52] U.S. Cl. ........................... 128/205.12; 128/202.26; 128/205.17
[58] Field of Search .................. 128/202.26, 205.12, 128/205.28, 205.17

[56] References Cited

U.S. PATENT DOCUMENTS

| | | | |
|---|---|---|---|
| 1,814,506 | 7/1931 | Davis | 128/205.21 |
| 1,999,086 | 4/1935 | Claudius | 128/205.12 |
| 2,403,981 | 7/1946 | Jackson et al. | 128/205.12 |
| 2,507,450 | 5/1950 | Millikan et al. | 128/202.26 |
| 3,208,449 | 9/1965 | Bartlett, Jr. | 128/202.27 |
| 3,292,617 | 12/1966 | McDonough | 128/205.16 |
| 3,316,905 | 5/1967 | Seeler | 128/204.28 |
| 3,390,676 | 7/1968 | Warncke et al. | 128/204.28 |
| 3,397,693 | 8/1968 | Warncke | 128/204.28 |
| 3,527,214 | 9/1970 | Rio | 128/202.26 |
| 3,565,068 | 2/1971 | Bickford | 128/202.26 |
| 3,575,167 | 4/1971 | Michielsen | 128/205.28 |
| 3,655,346 | 4/1972 | Cotabish et al. | 23/281 |
| 3,692,026 | 9/1972 | Tepper et al. | 128/205.12 |
| 3,710,553 | 1/1973 | Parker et al. | 55/316 |
| 3,762,407 | 10/1973 | Shonerd | 128/205.21 |
| 3,794,030 | 2/1974 | Cotabish et al. | 128/201.13 |
| 3,815,592 | 6/1974 | Staub, Jr. | 128/205.12 |
| 3,942,524 | 3/1976 | Li et al. | 128/202.26 |
| 4,164,218 | 8/1979 | Martin | 128/201.25 |
| 4,168,706 | 9/1979 | Fletcher et al. | 128/204.16 |
| 4,195,627 | 4/1980 | Haertle | 128/202.26 |
| 4,233,971 | 11/1980 | Gronau et al. | 128/202.26 |
| 4,253,454 | 3/1981 | Warncke | 128/202.26 |
| 4,365,628 | 12/1982 | Hodel | 128/205.12 |

FOREIGN PATENT DOCUMENTS

| | | | |
|---|---|---|---|
| 331364 | 10/1918 | Fed. Rep. of Germany | 128/205.12 |
| 680053 | 7/1933 | Fed. Rep. of Germany | 128/205.12 |
| 891497 | 8/1953 | Fed. Rep. of Germany | 128/205.12 |
| 1141186 | 12/1962 | Fed. Rep. of Germany | 128/205.12 |
| 60930 | 3/1968 | Fed. Rep. of Germany | 128/202.26 |
| 956312 | 1/1950 | France | 128/205.12 |
| 354739 | 12/1937 | Italy | 128/205.12 |
| 415678 | 8/1934 | United Kingdom | 128/205.12 |
| 499878 | 3/1976 | U.S.S.R. | 128/205.12 |

*Primary Examiner*—Henry J. Recla
*Attorney, Agent, or Firm*—Watts, Hoffmann, Fisher & Heinke

[57] ABSTRACT

A lightweight portable, self-contained, closed-type breathing apparatus comprises an oxygen pressure cylinder having connected thereto manually actuated oxygen flow control means. Included is a carbon dioxide scrubber having connected thereto breathing means including check valves and a breathing tube. A flexible breathing bag is provided, as are means for mounting the oxygen cylinder, the flow control means, the scrubber and check valves in fixed mutual relationship, with the oxygen cylinder and scrubber disposed within the breathing bag. The flow control means is constructed upon actuation, to meter flow of oxygen from the cylinder into the breathing bag. The check valves cause a user's exhaled breath to pass through the scrubber before entering the breathing bag, while causing a user to inhale directly from the breathing bag, bypassing the scrubber. An external canister protects the bag from accidental damage.

17 Claims, 6 Drawing Figures

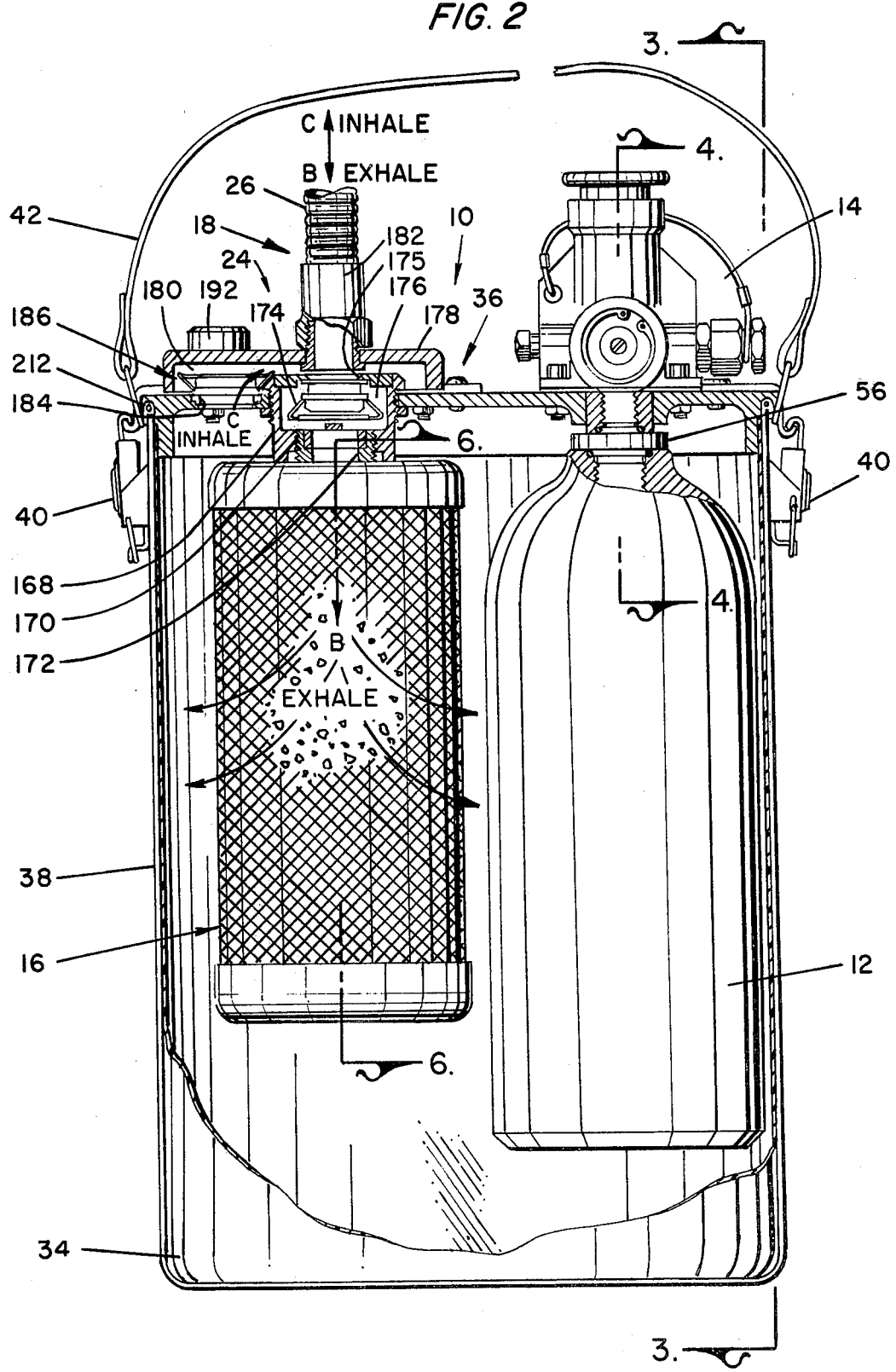

PORTABLE, SELF-CONTAINED BREATHING APPARATUS

CROSS REFERENCE TO RELATED APPLICATION

This application is a continuation-in-part of co-pending application Ser. No. 159,779 filed June 16, 1980, now abandoned.

BACKGROUND OF THE INVENTION

1. Field of the Invention

The present invention relates generally to the field of self-contained breathing apparatus, and more particularly to closed-type, oxygen breathing apparatus.

2. Prior Art

Various types of apparatus are known for enabling a user to live and function in hostile atmospheres containing poisonous materials or containing insufficient oxygen to sustain life. One familiar example of such apparatus is the pumped air system used by suited, underwater divers.

Currently more common are portable, Aqua-lung or SCUBA (Self Contained Underwater Breathing Apparatus) gear used by free divers and in similar form, by fire fighters in many hazardous situations. Typically, SCUBA-type apparatus employ a relatively large compressed air tank, a mouthpiece or face mask being connected to the tank through a flow regulator-usually of a demand type. With such apparatus, users inhale from the tank and exhale into the ambient atmosphere.

Currently, there exist requirements in the United States by MSHA (Mine Safety and Health Administration), that portable lightweight, self-contained emergency breathing apparatus, having at least one hour capacity, be provided for all underground users in this country. SCUBA-type breathing apparatus, which may be considered "open" systems because users exhale into the ambient, are generally unsatisfactory for such an application because of the relatively large size and weight of the apparatus necessary to provide a one hour breathing capacity. Consequently, alternative, more compact and light weight, breathing apparatus are preferred for applications requiring relatively long breathing capacity.

Some types of portable oxygen breathing apparatus are constructed to provide breathable oxygen generated as a chemical reaction product, thereby ordinarily eliminating the need for pressurized oxygen tanks. However, because of the type of chemical reactants used, such apparatus tend to be considered potentially unsafe. To applicant's knowledge, no oxygen-generating breathing apparatus for one hour duration have been approved for emergency use by NIOSH (National Institute for Occupational Safety and Health) and MSHA (Mine Safety and Health Administration).

Portable oxygen breathing apparatus are more typically constructed to use gaseous oxygen from one or more pressure tanks. In some systems a user breathes from the tank and exhales into the atmosphere; however, this is wasteful of the oxygen. Preferably, closed systems are used in which oxygen from a tank is mixed with a user's exhaled breath before breathing. Scrubbers or chemical absorbers are provided to reduce the concentration of exhaled carbon dioxide to an acceptable level. Ordinarily in such closed-type systems prebreathing mixing of pure oxygen and scrubbed, exhaled breath is accomplished in a flexible bag.

However, heretofore available closed oxygen tank breathing apparatus have, for various reasons, not been entirely satisfactory; hence, substantial improvements are required to provide the safe, reliable emergency breathing apparatus required for life endangering situations. For example, some heretofore available closed oxygen apparatus have had relatively exposed, and hence relatively easily damaged, mixing bags. Also, many known apparatus are constructed so that a user inhales, as well as exhales, through the carbon dioxide scrubber, thereby permitting excessive amounts of unabsorbed carbon dioxide to be inhaled.

Some available types have relied, to obtain one hour breathing capacity, upon low oxygen flow rates, thereby requiring complicated and expensive demand regulators. Other types have been constructed as "throw away" apparatus and are relatively expensive, since they are non-replaceable after use. In addition, these "throw away" apparatus cannot be periodically serviced or recharged as may be necessary to maintain required high levels of reliability.

For these and other reasons, applicant has invented a greatly improved, closed-type, oxygen breathing apparatus in which, for example, the breathing bag is protected against damage and in which danger of rebreathing exhaled carbon dioxide is substantially eliminated.

SUMMARY OF THE INVENTION

According to the present invention, a self-contained, closed-type breathing apparatus comprises a flexible breathing bag, a pressure container adapted for containing a breathable gas under pressure, and a scrubber for absorbing carbon dioxide from a user's breath that passes therethrough. Means are included for mounting the pressure container and scrubber within the breathing bag. Actuable flow control means are connected to the pressure container for regulating flow of gas from the container into the breathing bag and means are connected to the scrubber for enabling a user to exhale into the breathing bag therethrough and to inhale directly from the breathing bag. Sealing means are provided for sealing the breathing bag against the outside atmosphere to thereby enable a user to exhale into, and inhale from, the mixing bag without exhaling into, or inhaling from, the ambient atmosphere.

More particularly, the means connected to the scrubber includes first and second check valves, the first check valve causing a user to exhale into the breathing bag through the scrubber and the second check valve causing the user to inhale directly from the mixing bag without inhaling through the scrubber.

The pressure container is particularly adapted for containing gaseous oxygen and the flow control means is configured for regulating pressure and flow of oxygen from the pressure container into the breathing bag, preferably at a rate of approximately three liters per minute. Carbon dioxide is absorbed in the scrubber by a commercially available chemical sold under the name "Soda Sorb" by Dewey and Almey division of W. R. Grace. The chemical is basically sodium hydroxide and calcium oxide.

To enable a breathing time of at least about one hour, the pressure container is configured to contain enough oxygen at a pressure of about 2000 psi to supply 200 liters of oxygen to the breathing bag at a pressure of about 2 inches water column, the breathing bag being configured to contain approximately 5 liters of breathable gas. The scrubber is configured to contain at least about two pounds of suitable chemical, such as Soda Sorb. For such configuration the apparatus has an approximate weight of about eight pounds.

A protective cover is provided for enclosing the mixing bag to prevent damage thereto, and means are provided for enabling a user to conveniently carry the apparatus.

Preferably, the flow control means is configured for enabling recharging of the pressure container with oxygen (or other breathable gas) and the scrubber is constructed to be replaceable after use.

Because of mounting the oxygen pressure container and scrubber inside the breathing bag, the size of the apparatus can be smaller and more compact than theretofore available emergency breathing apparatus of comparable capacity, thereby being particularly advantageous in such places as mines where space is ordinarily restricted. The check valve arrangement in the breathing portion requires that all a user's exhaled breath pass through the scrubber for carbon dioxide absorption; whereas, the user inhales directly from the breathing bag, bypassing the scrubber, so that reinhaling carbon dioxide, still incompletely absorbed in the scrubber, is prevented.

Construction of the apparatus with the pressure container and scrubber disposed inside the breathing bag, as well as enclosing the breathing bag by the external protective cover, prevents damage to the bag, such as puncturing by sharp objects of the type commonly found, for example, in mines.

Applicant's apparatus is also adapted, because of its comparative light weight and long breathing capacity, for many applications other than mine safety.

In addition to increasing breathing time capacity, by recycling portions of a user's breath, the essentially closed nature of the apparatus makes it useful for applications in which exhaling into the surrounding atmosphere is undesirable.

Since the pressure container is rechargeable through the flow control means and the scrubber is replaceable, the apparatus can easily be made reusable after use and may be periodically serviced to assure readiness for emergency use. As a result, the apparatus is very cost effective.

BRIEF DESCRIPTION OF THE DRAWINGS

A better understanding of the present invention may be had from a consideration of the following detailed description, taken in conjunction with the accompanying drawings in which:

FIG. 2 is a partial cross-sectional view, taken generally along line 2—2 of FIG. 1, showing internal configuration of the breathing apparatus of FIG. 1, and in particular an exhaling and inhaling check valve configuration;

DESCRIPTION OF THE PREFERRED EMBODIMENT

Figure 1:
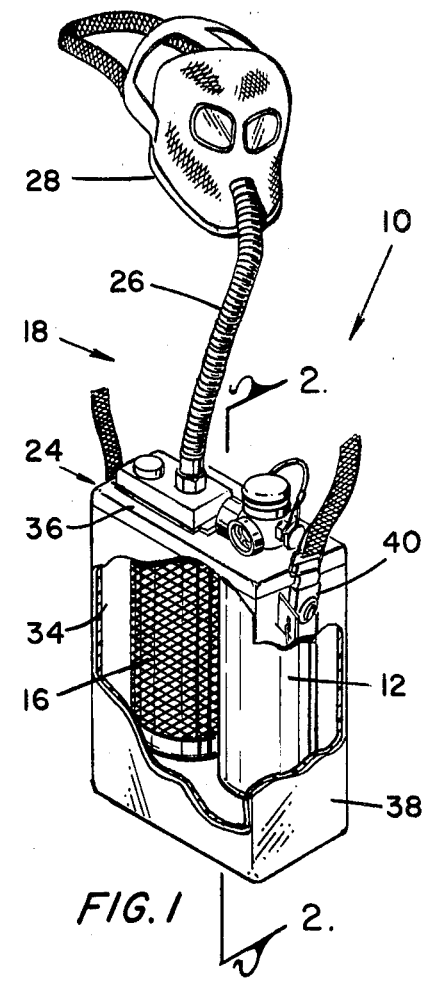
FIG. 1 is a partially cut away perspective drawing showing general features of a portable, self-contained closed-type, pressurized oxygen breathing apparatus according to the present invention.

As shown generally in FIG. 1, a portable, self-contained, closed-type pressurized oxygen breathing apparatus 10, according to the present invention, comprises a metallic, gaseous oxygen pressure container, tank or cylinder 12, to an open end of which is connected an oxygen flow control system 14. Included in the apparatus 10 are a carbon dioxide absorber or scrubber 16, to which are connected a breathing assembly 18 which includes check valve structure 24, associated with the scrubber assembly for controlling the flow path of a user's exhaled and inhaled breath, a flexible breathing tube 26 connected to the check valve structure, and a user breathing end portion 28, which may, for example, comprise a generally conventional face mask adapted for covering a user's eyes, nose and mouth, or more preferably, a mouthpiece and nose clip of known design.

Further comprising the breathing apparatus 10 is a generally rectangular, flexible breathing bag 34. Rigid, generally rectangular, metallic mounting structure 36 is provided for mounting the oxygen cylinder 12, flow control system 14, the scrubber 16 and the check valve structure 24 in fixed relative relationship, with the oxygen cylinder and the scrubber disposed in side-by-side spaced apart relationship entirely within the bag. The mounting structure 36, which is a plate-like affair, also forms an upper closure for the breathing bag 34.

Surrounding the breathing bag 34, to provide protection therefor, is a rigid external canister or cover 38, of suitable non-frangible material, such as ABS plastic, releasably attached to the periphery of the mounting structure 36 by a plurality of conventional, spring-type, clamps 40. A suitable seal, described below, is provided at the upper peripheral edge of the breathing bag 34, between the mounting structure 36 and canister 38 when the cannister is attached, thereby isolating interior regions of the breathing bag from the surrounding ambient atmosphere.

Wearing or carrying of the breathing apparatus 10, is enabled by a shoulder strap or harness 42, preferably attached to upper sides of the apparatus in regions of the mounting structure 36.

As shown, the breathing apparatus 10 is completely self-contained, with the oxygen tank 12 and scrubber 16 mounted entirely within the breathing bag 34, the bag being in turn, protectively disposed within the cannister 38. In a manner more particularly described below, oxygen from the tank 12 is mixed or combined in the breathing bag 34 with a user's scrubbed and filtered exhaled breath. Thus, the apparatus 10 is a closed breathing system in which the user breathes into and from the breathing bag.

As an illustrative example of size of the apparatus 10, to provide a one hour breathing capacity, overall apparatus dimensions are only approximately 16¾" high by 11⅜" wide by 6½" deep, with a total weight of only approximately 8 lbs.

Figure 3:
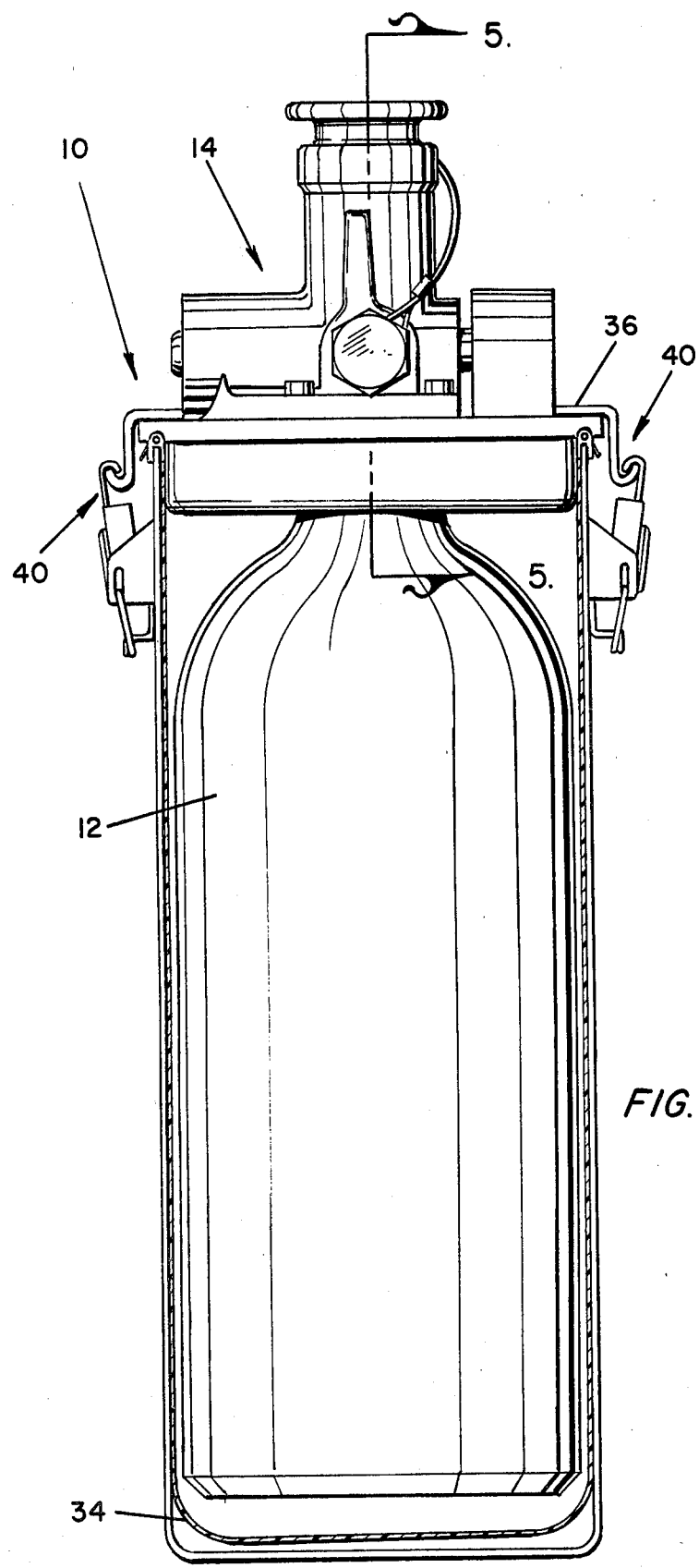
FIG. 3 is a cross-sectional view, taken along line 3—3 of FIG. 2, showing features of oxygen flow control portions of the breathing apparatus.

More particularly shown in FIGS. 2 and 3, the oxygen cylinder or tank 12 preferably comprises a conventional compressed-oxygen bottle having, for example, to meet a one hour breathing requirement, a capacity of approximately 247 liters, but at least about 200 liters, at breathing pressure. For such capacity, the tank 12 may therefore be a standard medical size, about 11" in height and 4¼" in diameter. The contents are pressurized to about 2000 psig and the oxygen is released at a flow rate of approximately three liters per minute, into the breathing bag 34 through the control system 14.

Figure 4:
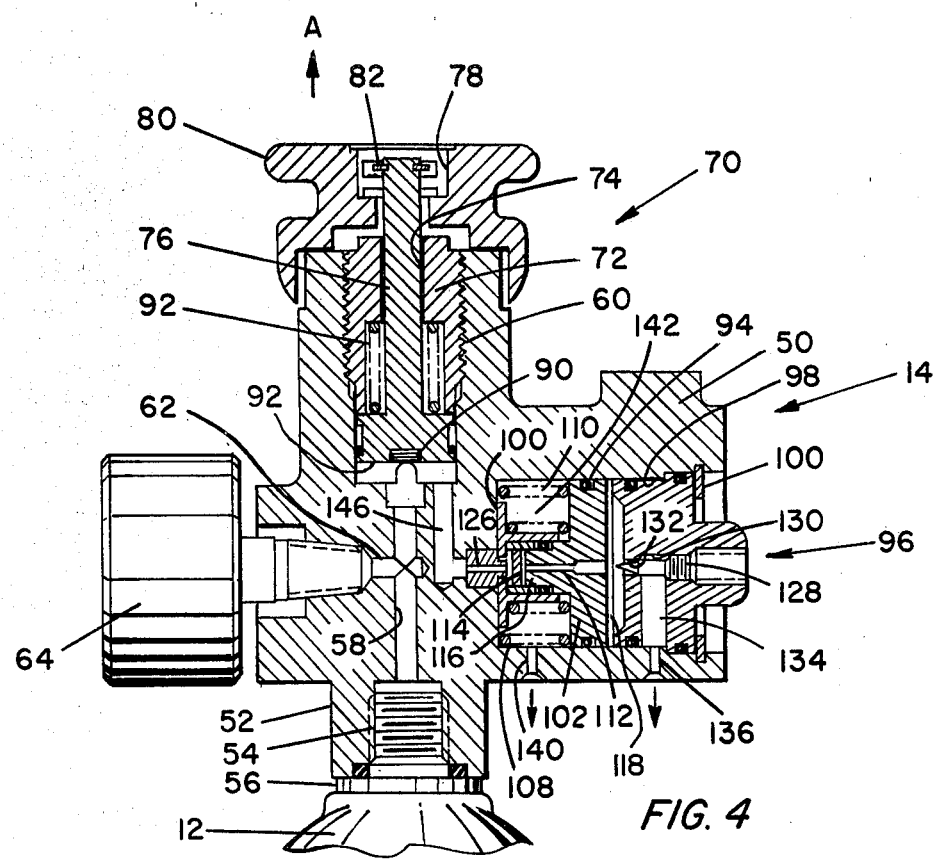
FIG. 4 is a cross-sectional view, taken along line 4—4 of FIG. 2, showing internal construction of the oxygen flow control portion.
Figure 5:
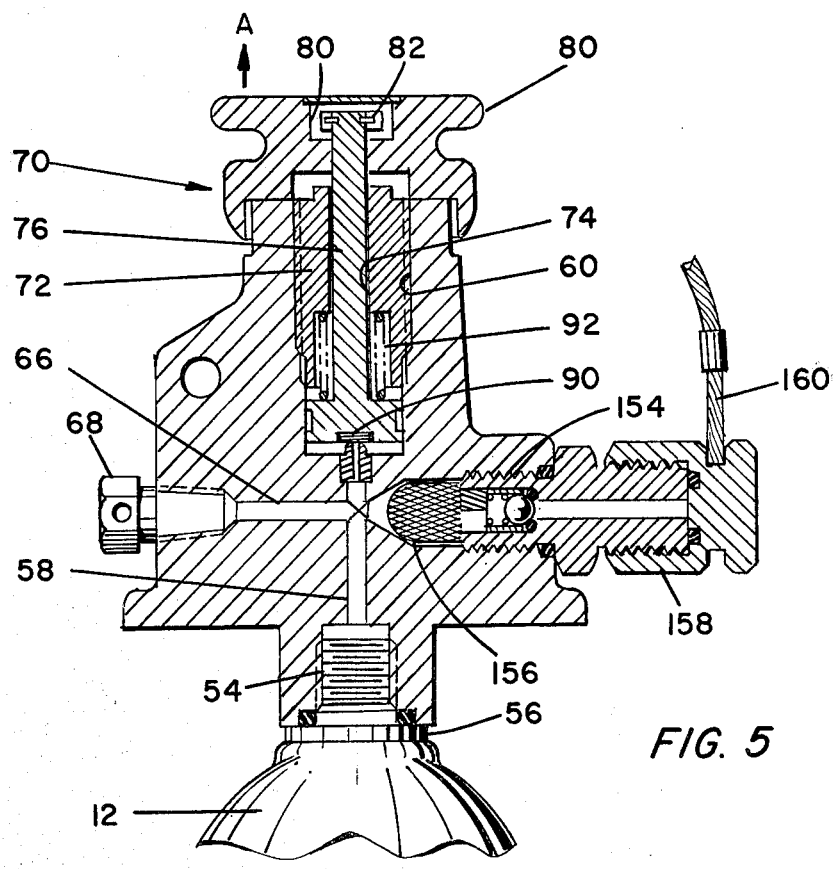
FIG. 5 is a cross-sectional view, taken along line 5—5 of FIG. 3, also showing additional internal construction of the oxygen flow control portion.

As shown in FIGS. 4 and 5, the flow control system 14 comprises a housing 50 having a depending oxygen-bottle-connecting portion 52 formed with an internally threaded bottle-connecting aperture 54. Threaded into the aperture 54 is a male adapter or connecting fitting 56 (see also FIG. 2) onto lower regions of which the oxygen tank 12 is threaded. From the aperture 54, a small diameter oxygen flow bore or aperture 58 is formed upwardly (in the vertical orientation shown in the Figures) through the housing 50 into communication with a deep cylindrical recess 60. Extending through a side region of the housing 50 to the flow aperture 58 is an aperture 62 in which a pressure gauge 64 is threaded to indicate the pressure in the bore 58.

Formed through the housing 50, at right angles to the gauge-communicating aperture 62, is a pressure-relief bore or aperture 66 (FIG. 5) which also extends to the bore 58. Threaded into an outer end of the pressure relief bore 66 is a conventional burst or rupture diaphragm assembly 68 constructed to rupture at an oxygen tank pressure less than that which would cause system damage. For example, for a 2015 psi operating pressure in the tank 12, the diaphragm assembly 68 is preferably selected to have a burst pressure rating of approximately 3000 psi.

Oxygen flow through the flow bore 58 is alternatively blocked or enabled by a manually actuated pull valve 70, a threaded bushing or outer sleeve portion 72 of which is threaded into the recess 60. Slidably mounted through an axial bore 74 of the bushing 72 is an elongated stem 76. An upper end of the stem 76 is retained in a recessed region 78 of a pull cap 80, by a snapring 82 so that a sharp axial pull on the pull cap, upwardly in the direction of Arrow "A", pulls the stem outwardly away from the flow bore 58. As this occurs, a pin-type orifice seal 90, which during non-use seals the upper end of the flow bore 58 and prevents oxygen flow, is pulled out of sealing relationship with the flow bore, thereby permitting flow of oxygen from the tank 12 through such aperture and subsequently into the breathing bag 34, as described below. A coil spring 92 radialy disposed between the bushing 72 and lower regions of the stem 74 ordinarily forces the stem downwardly with sufficient force to cause the orifice seal 90 to completely seal the flow aperture 58 until the pull cap 80 is actuated to initiate oxygen flow. Because of small area size of the orifice seal 90 against which tank oxygen pressure acts, the spring 90 is sufficiently strong to cause sealing of the flow aperture 58 during non-use. When, however, the pull cap 80 is pulled upwardly raising the stem 74, oxygen pressure acts upon a larger area, lower surface 92 of the stem 74 to keep the stem in a lifted condition permitting oxygen flow.

Also comprising the flow control assembly 14 are a flow regulator piston assembly 94 and end cap assembly 96, both of which are installed in a deep, cylindrical recess 98 formed into the housing 50 from a side region opposite the gauge-communicating aperture 62 (FIG. 4). The end cap assembly 96, which is retained in the recess 98, and the axial length of the piston assembly 94, are selected and arranged to permit limited axial movement of the piston assembly after the cap assembly 96 is installed.

Included in the flow regulator piston assembly 94 is a piston guide 100 and a piston 102, which are urged axially apart by inner and outer coil springs 108 and 110, respectively.

Formed almost entirely through the piston 102, from an outer end and along the axis thereof, is a small diameter bore 112. An inner end of the bore 112 communicates with a small diameter, transverse aperture or bore 114, formed through a small diameter piston inner end region 116. An outer end of the bore 112 communicates with an axially short, disc-shaped pressure chamber 118 defined between the piston 102 and the end cap assembly 96.

A small diameter flow metering orifice 126 is formed axially through the piston guide 100. When the piston 102 is pushed as far as possible into the housing by oxygen pressure in the chamber 118, as described below, the metering orifice 126 is sealed off by a metering pin end or inner region 116 of the piston 102. However, the springs 108 and 110 normally urge the piston 102 outwardly towards the cap assembly 96, leaving the metering orifice 126 open in the absence of any oxygen flow through the flow control system 14.

Flow rate from the tank 12 into the breathing bag 34 is determined by adjustable metering pin or valve 128 threadably installed in an aperture 130 formed axially through the cap assembly 96. An inner flow metering end of the pin 128 controls oxygen flow through a metering orifice portion 132 of the aperture 130.

A side bore 134 formed radially through the cap assembly 96 communicates from the aperture 130 adjacent the orifice portion 132 to an aperture 136 formed through the housing 50, such aperture communicating with an aligned aperture (not shown) formed through the mounting structure 36, which is flush against the housing 50, as shown in FIG. 2, to communicate with the bag 34. Similarly, a pressure balancing aperture 140, formed through the housing 50 enables pressure communication between a chamber 142 (defined between the piston guide 100 and piston 102) and the breathing bag 34, through an aligned aperture (not shown) formed through the mounting structure 14.

Communicating between the piston guide metering orifice 126 and the flow bore 58, when the pull cap 80 is pulled up to start oxygen flow from the tank 12, is an L-shaped housing bore or aperture 146.

Conventional "O" ring sealing means comprising individual "O" ring seals (not individually identified) installed between moving parts of the flow control system 14 prevent oxygen leakage from the housing 50 and between different regions thereof.

Pressure filling of the oxygen tank 12, through the flow control system 14, is enabled by a generally conventional check-type fill valve 154 threadably installed in a housing apeture 156 which communicates with the flow bore 58. Except when filling the tank 12, a pressure cap 158 closes and protects the fill valve 154. Retaining means 160, for example, a flexible cable or cord, attached between the cap 158 and other portions of the housing 50 or the mounting means 14 prevents loss of the cap.

As mentioned, under non-use conditions and until the pull cap 80 is pulled upwardly in the direction of arrow "A", the spring 92 forces the stem 76 into sealing relationship with the flow aperture 58. When the cap 80 is pulled upwardly with a force of about 12 pounds, oxygen from the tank 12 is permitted to flow through the aperture 58. Thereafter, tank pressure on the stem 76 keeps the stem from resealing the aperture 58 unless the pull cap is returned to its initial closed position or the tank pressure is reduced to less than about 100 psig.

With the aperture 58 held open in this manner, oxygen flows from the tank 12 through such aperture and through the L-shaped opening 146 now in communication therewith to the piston guide metering orifice 126. Oxygen thence flows through the metering orifice 126, around the inner, metering pin end, of the piston 102, through the apertures or bores 114 and 112 into the pressure chamber 118 between the piston and the end cap assembly 96.

From the chamber 118, oxygen flows through the orifice portion 132 and the apertures 130, 134, and 136 into the mixing bag 34.

According to pressure in the breathing bag 34, as directed through the aperture 140 to the chamber 142 between the piston 102 and piston guide 100, relative to pressure in the pressure chamber 118, the piston is axially moved in a manner metering or controlling oxygen flow through the metering orifice 126. In this regard, pressure in the chamber 142 acts on a lesser area of the piston 102 than does the pressure in the chamber 118, a sensitive balancing being provided to regulate flow of oxygen into the bag 34 at an average predetermined rate of about three liters per minute in the preferred embodiment, as determined by adjustment of the manually adjustable metering pin 128 in the end cap assembly 96, while maintaining a desirable pressure in the bag of approximately 0.054 psig (1½" of water) in the preferred embodiment.

Returning to FIG. 2, the check valve structure 24, which is mounted on the mounting structure 36, includes a depending portion 168, which extends through the mounting structure into the mixing bag 34. An internally threaded aperture 170 in the portion 168 releasably receives an upper threaded neck portion 172 of the scrubber 16.

A first, flapper-type check valve 174 is disposed in a first chamber 176 formed in a check valve housing assembly 178. The chamber 176 communicates in a lower region with the aperture 170 and in an upper region with a second large, generally disc-shaped chamber 180. The first check valve 174 controls flow through an aperture 175 between the chambers 176 and 180.

The second chamber 180 communicates between an end connector 182 of the breathing tube 26 and an aperture 184 formed through the mounting structure 36 into the inside of the breathing bag 34, but outside of the scrubber 16. A second check valve 186 is installed at the aperture 184 to control direction of air flow therethrough.

In operation, when a user exhales into and through the breathing tube 26, the second check valve 186 is forced closed to seal off the aperture 184 leading from the tube directly into the breathing bag 34. Simultaneously, the first check valve 174 is forced open, causing the user's exhaled breath to flow, in the direction of Arrow "B", through the apertures 175 and 170 and into interior regions of the scrubber 16.

Conversely, as the user inhales through the breathing tube 26, the first check valve 174 closes, preventing inhaling back through the scrubber 16. Simultaneously, the second check valve 186 opens, enabling the user to inhale directly from the breathing bag 34, through the aperture 184 (direction of Arrow "C"), thus, a user's exhaled breath is forced through the scrubber 16 for absorption of carbon dioxide therefrom; whereas, the inhaled breath bypasses the scrubber, breathable air being drawn directly from the bag 34.

This feature has an important advantage of assuring that no carbon dioxide from the user's exhaled breath is re-inhaled, at least so long as chemical absorbing agents in the scrubber means remain active. In contrast, if the user were to inhale back through the scrubber 16, unabsorbed carbon dioxide temporarily entrapped in the absorbing agents, before complete absorption, would be drawn back out of the scrubber for rebreathing. This would ordinarily increase the content of carbon dioxide in the inhaled air substantially above the allowable 0.2 percent permitted by governing regulations.

Installed through the housing assembly 178, in communication with the second chamber 180, is a pressure relief valve 192 set at slightly above the desired breathing bag pressure of 0.054 psig. Thus, the user is protected against over-pressure in the breathing bag 34 from the source 12, which in operation supplies oxygen at a rate sufficient to allow the user to engage in the necessary activity, which may be greater than the actual consumption of oxygen at any given time and the bag is, as well, protected against pressure damage.

Figure 6:
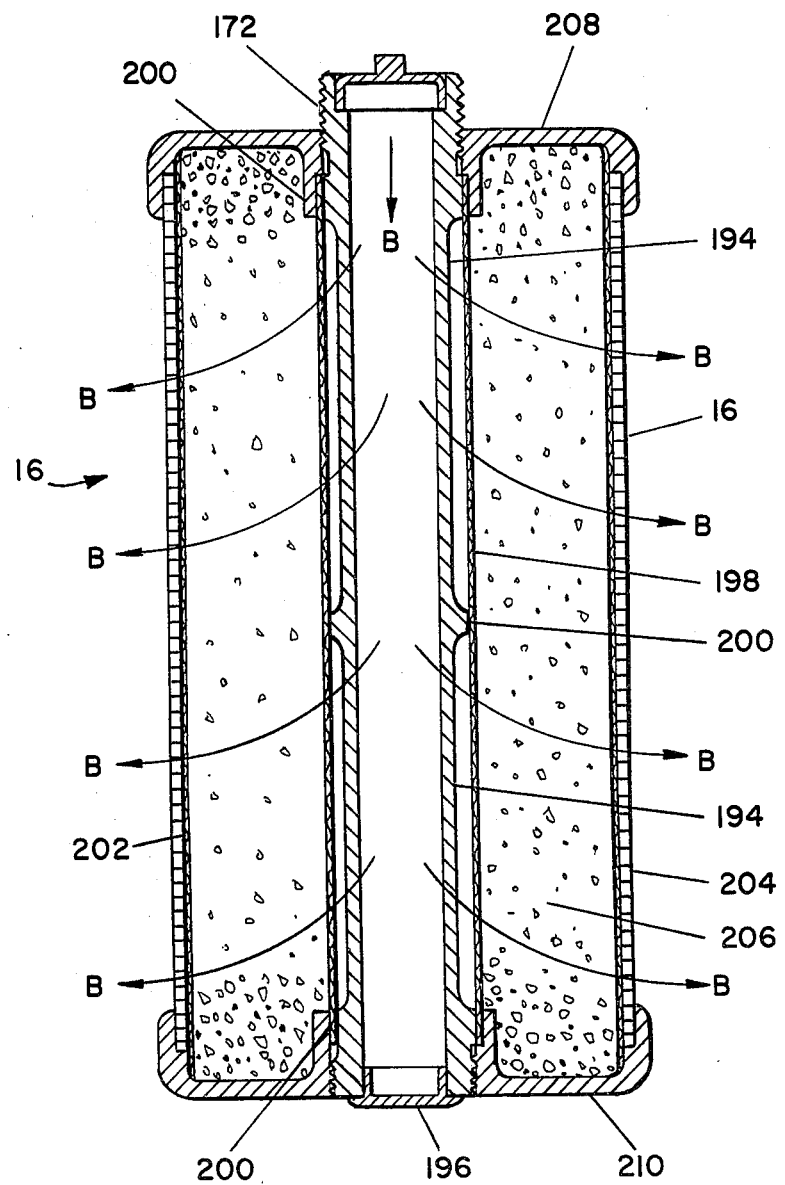
FIG. 6 is a cross-sectional view, taken along line 6—6 of FIG. 2, showing construction of scrubbing, i.e., carbon dioxide absorbing, means of the breathing apparatus.

Comprising, as shown in FIG. 6, the scrubber 16, is a slotted or perforated, tubular axial member 194, which extends the entire height (axial length) of the scrubber and which is closed, at a lower end, by a plug 196. An upper end of the member 194 comprises the above-mentioned upper end or neck portion 172 of the scrubber 16.

Disposed around the member 194, along the axial length thereof, is an inner screen 198 which is spaced radially outwardly from major portions of the member by narrow annular bosses or flanges 200 formed around the member. Spaced radially outwardly from the inner screen 198 is an outer screen 202, which has wrapped therearound a dust filter 204.

Packed between the two screens 198 and 202 is a granular chemical agent 206. Maintaining the screens 198 and 202, the filter 204, the agent 206, in position and closing the scrubber 16, is an annular upper closing cap or disc 108 and an annular lower closing cap or disc 210.

Configuration of the scrubber 16 is thus such that a user's exhaled breath travels down the inside of the member 194 and generally radially outwardly therethrough (Arrows "B"), passing also, in order, through the inner screen 198, the agent 206, the outer screen 202 and the filter 204 into the breathing bag 34.

Purpose of the screens 198 and 202, which may, as an illustration, be formed of number 20 mesh, type 304 stainless steel wire, is to contain the chemical agent 206. The filter 204, which may, for example, be formed of 3/16" thick felt, traps any exhaled dust particles within the scrubber means. Structural parts of the scrubber 16 may be made from ABS plastic.

In operation, exhaled carbon dioxide passing through the chemical agent 206 reacts with the sodium hydroxide to form sodium carbonate, being thereby absorbed. Exhaled air passing through the scrubber 16 thus comprises mostly nitrogen, with some traces of oxygen and carbon dioxide. As the carbon dioxide reacts with the sodium hydroxide, the sodium hydroxide is "deactivated."

Initially, the calcium oxide absorbs moisture from the user's exhaled breath, thereby preventing moisture pick up by the sodium hydroxide. In the process, the calcium oxide is converted to calcium hydroxide which subsequently functions as a carbon dioxide absorber until all the calcium hydroxide is converted into calcium carbonate.

It has been determined that for a one hour breathing capacity, the chemical agent 206 should comprise about two pounds of Soda-Sorb, residing in a scrubber having an outer diameter of about 4" and an axial length of about 8½" in the preferred embodiment.

Consistent with the above-mentioned size of the scrubber 16 and the oxygen tank 12 for a one hour breathing capacity, the breathing bag 34 is preferably formed having a total volume, when closed at the top by the mounting structure 36, of about 10 liters, thereby providing an actual breathing air volume of about 5 to 5.5 liters. Preferably, the breathing bag 34 is formed of thin aluminum coated Mylar preferably 0.001 inch in thickness.

Sealing of upper edge regions at the breathing bag 34 between the mounting structure 36 and the external protective cover 38 is by a circumferential neoprene seal 212.

As a result of the shown and described configuration, the self-contained breathing apparatus 10, even when having a one hour breathing capacity, is compact and light in weight as is important in many, if not most, emergency situations requiring use of the apparatus. Operation of the apparatus 10 is safe in that inhaled levels of carbon dioxide are assured to be at low levels due to bypassing of the scrubber 16 during inhaling. The breathing bag 34 is relatively protected against damage by being completely enclosed by the cover 38 and the mounting structure 36.

And since the oxygen cylinder 12 is easily recharged through the flow control system 14 and the scrubber 16 is replaceable after use, the apparatus 10 is reusable and is serviceable during prolonged periods of non-use, thereby assuring safe, reliable operation and causing the apparatus to be cost effective.

Although there has been described above a specific arrangement of a closed-type, portable breathing apparatus using pressurized oxygen in accordance with the invention for purposes of illustrating the manner in which the invention may be used to advantage, it will be appreciated that the invention is not limited thereto. Accordingly, modifications, variations or equivalent arrangements may be made therein by those skilled in the art without departing from the scope of the invention defined in the appended claims.

What is claimed is:

1. Self-contained, closed-type breathing apparatus, which comprises:
   (a) a thin flexible breathing bag;
   (b) a metallic pressure container containing a breathable gas under high pressure;
   (c) scrubber means adapted for removing carbon dioxide from a user's breath through a chemical reaction while concurrently passing nitrogen from a user's breath therethrough;
   (d) a cannister having an open end adapted to house said metallic pressure container, said scrubber means and said bag;
   (e) metallic mounting structure mounted across said open end of said cannister, said pressure container and said scrubber means being mounted to said mounting structure such that they are in direct heat conducting relationship, said bag being mounted within said cannister to enclose said pressure container and said scrubber means;
   (f) gas flow control means connected to the pressure container for regulating flow of breathable gas from the pressure container into the bag;
   (g) breathing means connected to the scrubber means for enabling a user to exhale into the bag through the scrubber means and to inhale directly from the bag; and
   (h) sealing means for sealing the bag within the cannister and around said pressure container, said scrubber means, said gas control means and said breathing means to prevent gas inflow from the outside amient to thereby enable a user to exhale into and inhale from the bag without exhaling directly into or inhaling from the outside ambient atmosphere;
   (i) said pressure container and metallic mounting structure being adjacent said scrubber and serving to effectively conduct heat from within the bag to without and to dissipate heat from the scrubber.

2. The breathing apparatus as claimed in claim 1, wherein the means connected to the scrubber means includes first and second check valves, said first check valve being positioned and operative for causing a user to exhale into the bag through the scrubber means and said second check valve being positioned and operative for causing a user to inhale directly from the bag by bypassing the scrubber.

3. The breathing apparatus as claimed in claim 1, wherein the pressure container is adapted for containing gaseous oxygen at a preselected pressure and wherein the gas flow control means is constructed to regulate flow of said gaseous oxygen from the pressure container into the mixing bag at a constant preselected rate.

4. The breathing apparatus as claimed in claim 1, wherein the scrubber means includes a container containing sodium hydroxide and calcium oxide.

5. The breathing apparatus as claimed in claim 4, wherein said mixing bag has a breathing volume of at least about 5 liters and said pressure container is configured for containing oxygen at a pressure of about 2000 psig in an amount sufficient to supply at least 200 liters of gaseous oxygen at ambient pressure, wherein said flow control means is operative for providing a flow of oxygen into the bag from the pressure container at a constant rate of about three liters per minute and wherein the scrubber means includes a container containing at least about two pounds of a combination of sodium hydroxide and calcium oxide, a breathing time of at least about one hour being thereby provided by the appartus.

6. The breathing apparatus as claimed in claim 1, wherein the pressure container is adapted for containing pressurized oxygen and wherein the flow control means is configured for enabling a flow of oxygen from the container into the mixing bag at a constant flow rate of approximately three liters per minute.

7. The breathing apparatus as claimed in claim 1, wherein the flow control means includes means enabling recharging of the pressure container and wherein the scrubber means is replaceable.

8. The breathing apparatus of claim 1 wherein said breathing bag has an opening that is clamped between the open end of the cannister and the metallic mounting structure.

9. A portable, self-contained, closed-type breathing apparatus, which comprises:
   (a) a thin flexible breathing bag for containing a breathable air mixture for a user;
   (b) a metallic pressure container within the breathing bag for containing a preselected quantity of pressurized oxygen;
   (c) scrubber means within the breathing bag for removing through a chemical reaction gaseous carbon dioxide exhaled by a user;
   (d) a cannister having an open end adapted to house said metallic pressure container, said scrubber means and said bag;
   (e) mounting means for covering said open end of said cannister and for mounting said pressure container and said scrubber means and said bag inside the cannister, said mounting means having substantial heat conducting properties, said pressure container and said mounting means being in direct heat conducting relationship;
   (f) said pressure container and mounting means being adjacent said scrubber and serving to effectively conduct heat from within the bag to without and to dissipate heat from the scrubber;
   (g) flow control means connected to the pressure container for controlling the flow of oxygen from said container into the bag;
   (h) breathing means cooperating with the scrubber means for enabling a user to exhale into the bag through the scrubber means and to inhale directly from the bag without inhaling through the scrubber means; and
   (i) sealing means for sealing the bag within said cannister and around said pressure container, said scrubber means, said flow control means and said breathing means to prevent gas inflow from the ambient atmosphere to thereby enable a user to breath into and from the bag without breathing from the ambient atmosphere.

10. The breathing apparatus as claimed in claim 6, wherein the mounting means includes a rigid metallic plate to which the pressure container, the flow control means, the scrubber means and the breathing means cooperating with the scrubber means are attached.

11. The breathing apparatus as claimed in claim 6, wherein the scrubber means includes a container containing a combination of sodium hydroxide and calcium oxide.

12. Breathing apparatus as set forth in claim 1 or 9 wherein said gas flow control means supplies gas at a substantially constant preselected rate of flow.

13. The breathing apparatus of claim 9 wherein said mounting means is directly exposed to the inside of the bag across substantially the width and breadth of the bag.

14. A portable, self-contained, closed-type, one hour oxygen breathing apparatus, which comprises:
   (a) a thin flexible plastic breathing bag having a volume of about 5 liters, said bag having a pressure relief valve;
   (b) a metallic pressure tank containing pressurized oxygen at a pressure of at least about 2000 psig in a quantity sufficient to supply at least about 200 liters of oxygen at ambient pressure;
   (c) carbon dioxide absorbing scrubbing means including a combination of sodium hydroxide and calcium oxide;
   (d) a cannister having an open end adapted to house said metallic pressure tank, said scrubbing means and said bag;
   (e) means mounting the pressure tank and scrubber means within the bag closely adjacent each other, said mounting means being mounted on said cannister to cover said open end, being directly exposed to the inside of the bag, being adjacent both the scrubber and the pressure tank and having good heat conducting properties, said pressure tank and said mounting means being in direct heat conducting relationship, and said mounting means and pressure tank serving to effectively conduct heat from within the bag to without and to dissipate heat from the scrubber;
   (f) oxygen flow control means for controlling flow of oxygen from the pressure tank into the bag at a flow rate of about three liters per minute;
   (g) breathing means enabling a user to exhale into the bag through the scrubber means, carbon dioxide from the user's breath being thereby absorbed in the scrubber means through a chemical reaction, and enabling the user to inhale directly from the bag, bypassing the scrubber means; and
   (h) means sealing the inside of the bag within said cannister and around said pressure container, said scrubber means, said flow control means and said breathing means to prevent gas inflow from the outside ambient atmosphere except through the pressure relief valve and said breathing means, whereby a user does not inhale from, or exhale directly into the ambient atmosphere.

15. Breathing apparatus as set forth in claim 1, 9 or 14 including check valves associated with the bag, the means for removing carbon dioxide, and the breathing means through which a user exhales and inhales, for directing exhaled breath into the bag through the means for removing carbon dioxide and for allowing inhaled gas to be received by the means through which the user inhales directly from the bag without flowing through the means for removing carbon dioxide.

16. Breathing apparatus as set forth in claim 1, 9 or 14 or 15 including a pressure relief valve communicating between said bag and the ambient atmosphere to limit the maximum pressure within the bag.

17. The breathing apparatus of claim 14 wherein said breathing bag has an opening that is clamped between the open end of the cannister and the metallic mounting structure and is constructed of plastic approximately 0.001 inch thick.

* * * * *